Feb. 17, 1942. J. W. KUHN 2,273,206
METHOD AND APPARATUS FOR INCORPORATING FIBROUS MATERIAL IN RUBBER
Filed July 24, 1939 2 Sheets-Sheet 2
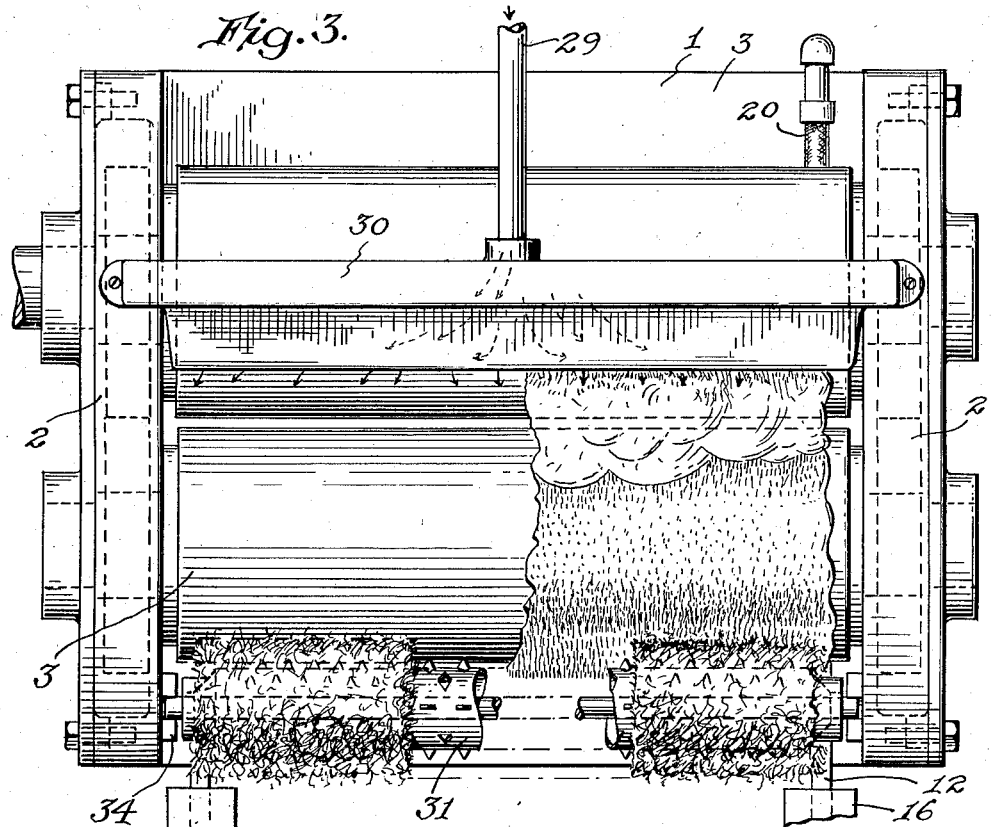
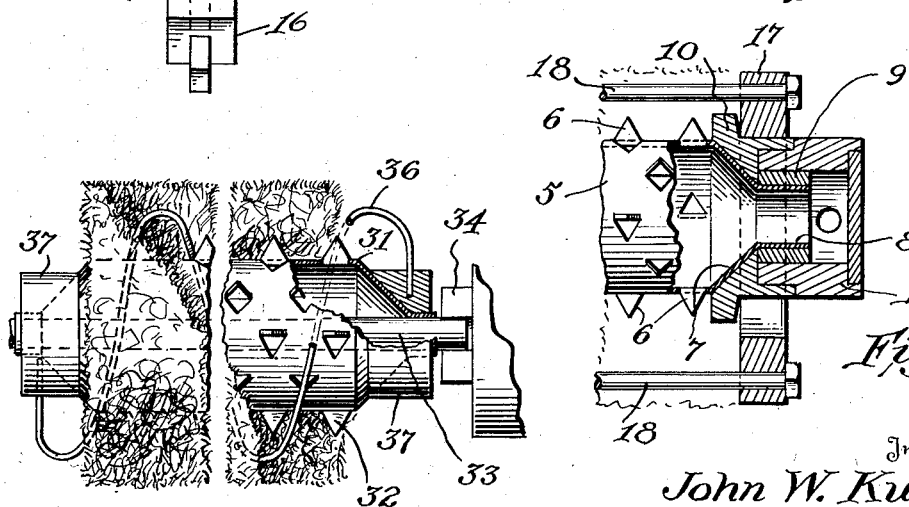
Inventor
John W. Kuhn
By Eccleston & Eccleston,
Attorneys Patented Feb. 17, 1942

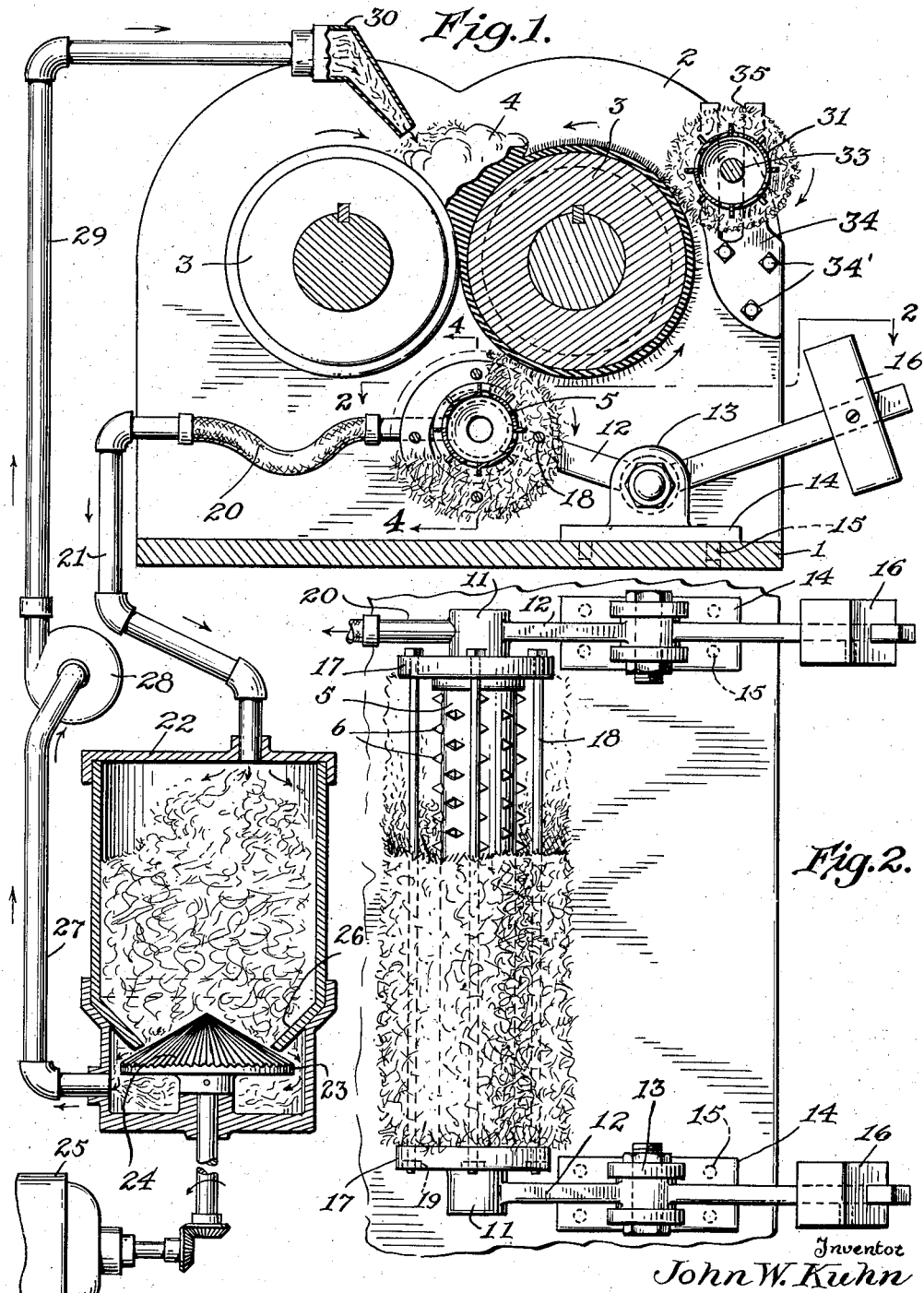

2,273,206

UNITED STATES PATENT OFFICE 2,273,206

METHOD AND APPARATUS FOR INCORPORATING FIBROUS MATERIAL IN RUBBER

John W. Kuhn, Akron, Ohio

Application July 24, 1939, Serial No. 286,297

17 Claims. (Cl. 18—2)

This invention relates to rubber and rubber products such as tire casings, garden hose, etc., and is directed primarily to a method and apparatus for incorporating fibrous material in rubber compounds such as are commonly used in tire casings.

While the rubber compositions in general use in tire casings, etc., have considerable durability it has been recognized that these compositions could be greatly improved by the addition of fibrous material such as cotton, wool, etc. With the incorporation of one or more of these materials in the ordinary rubber compounds the tensile strength of the rubber, its wearing qualities, etc., may be increased 50% or more, depending upon the amount of fibrous material added.

To properly incorporate cotton or the like in rubber compositions it is absolutely essential that the cotton be added in a highly divided state, otherwise it will ball-up into a hard knotty mass and will not blend with the rubber no matter how long the latter may be worked. It is partly for this reason that intimate mixtures of rubber and cotton or the like have never been placed in commercial use. The use of fiber-rubber generally has been very limited although the conception of utilizing fibrous material including cotton as a filler for rubber is old, and obviously its limited use has been due to quality and cost of production when compared with the more conventional compounds.

An object of the present invention resides in the provision of a simple and inexpensive method by which cotton or similar fibrous material may be rapidly added to ordinary commercial rubber, the cotton being added in segregated fine fibers or strands whereby it may be readily worked into the rubber without liability of forming balls or knots.

Another object of the invention consists in providing an apparatus by which the method of incorporating the cotton or similar material into the rubber may be readily carried out.

Other objects and advantages of the invention will be apparent from the following description when taken in connection with the accompanying drawings, in which Figure 1 is an end view of a conventional rubber mill, partly in section, and showing one form of attachment for incorporating fibrous material in the rubber.

Figure 2 is a fragmentary plan view taken on line 2—2 of Figure 1, and showing a supply of fibrous material, such as raw cotton, releasably held on a drum or mandrel.

Figure 3 is a plan view of the apparatus shown in Figure 1.

Figuret 4 is a sectional view of one end of a drum or mandrel on which the supply of fibrous material is mounted, and Figure 5 is an elevational view, partly broken away, showing a drum having a modified means for releasably retaining the fibrous material thereon.

In the working or kneading of raw rubber and the conventional ingredients employed therewith it is usual to place the materials in a roller mill such as shown in the present drawings and operate the same for about forty minutes, during which time the materials are thoroughly mixed with the rubber. During this operation the friction created causes the generation of heat thereby heating the material and rendering it somewhat tacky. After the kneading of the materials is completed the product is cut off of the rolls in the form of slabs and placed aside for a day or two, during which time it cools off and matures or ripens. Thereafter the material is placed in a "warm-up" mill which is a roller mill substantially the same as the original mill in which the initial kneading of the materials took place. The matured material is worked in the second mill for about twenty minutes and very quickly becomes hot and tacky as in the original operation. The material is then ready to be molded into tire casings, tubes, garden hose, motor supports, etc.

The present invention relates to the incorporation of fibrous material into the rubber composition in the second stage of operation indicated above, or during both stages if a high percentage, such as 50% or more of fibrous material is desirable for the particular article being produced at the time.

While the fibrous material producing the best results is ordinary raw cotton, either ginned or not, there are a number of other fibrous materials which will produce highly beneficial results if incorporated in the rubber in a homogeneous manner. Such materials are hair, feathers, wool, rock wool, glass wool and steel wool. These materials, if properly incorporated in the rubber composition not only improve its tensile strength and wear-resisting qualities but also will greatly reduce the amount of rubber necessary in the product, reduce its elasticity and compressibility, and generally increase its toughness.

In order that the filler material, whether it be cotton, feathers or the like, may be most effective, it is highly essential that they be incorporated in the rubber in their original state, that is without maceration, hydrolysis, or other well known methods of separating fibers. By means of the method about to be described the virgin fibers are automatically separated individually from the main supply of fibers and are then worked into rubber composition so as to produce a homogeneous product having high tensile strength, durability, etc.

In the apparatus illustrated herein as one means for performing the process of incorporating fibrous material in rubber compositions, the numeral 1 indicates the base plate of a conventional rubber mill, and numeral 2 indicates the end plates, which form supports for the conventional rollers 3. These rollers are usually geared together so as to rotate in opposite directions as indicated by the arrows in Figure 1, and are driven by a source of power (not shown). The supply of ingredients to be formed into the rubber composition is placed on the rollers at the point 4 as indicated, and as the material works through the rolls it is caused to encircle one of them as shown, and the material is continuously kneaded for the period of time desired.

To the conventional mill, as above described, or milling apparatus of similar design is added mechanism for carrying out the present process by which fibrous material in the form of fibers or strands is uniformly added to the rubber mass passing around the forward roller and then thoroughly worked into same to provide a homogeneous product having, when cured, the desired characteristics as to durability, tensile strength, toughness, etc.

The numeral 5 indicates a drum or mandrel formed of sheet metal and provided with struck-up tongues 6 for engaging the inner layer of the batch of cotton, wool or the like, which is wound thereon. The drum 5 is tapered adjacent its ends as indicated by numeral 7 so as to provide the reduced ends 8 to which are applied the bearing sleeves 9 and 10. The sleeves 9 are received in a pair of hub members 11 mounted on the inner ends of levers 12. These levers are pivotally mounted in bearings 13 formed on plates 14 which are preferably provided with integral pins 15 received in sockets formed in the upper face of base plate 1. The opposite ends of levers 12 are provided with adjustable counterweights 16, and these weights are usually positioned so as to bias the levers 12 and the loaded drum 5 towards the rollers 3 of the mill.

Loosely mounted on the bearings 10 of the roller 5 are rings 17 provided with a plurality of circumferentially spaced apertures for the reception of elongated rods 18 which extend between the rings and are secured in position by nuts 19. These rods of course are applied in position after the charge of cotton has been applied to the drum, and serve to retain the main body of fibrous material on the drum while allowing fibers, strands or the like to be withdrawn therefrom due to contact with the tacky rubber on the forward roller of the mill.

It is obvious that fragments of the fibrous material retained by the prongs 6 will enter the interior of the drum, and for this reason the ends of the drum are open and connect with the hollow hubs 11. A flexible hose or the like 20 is connected at one end to one of the hubs 11 and has its opposite end connected to a pipe 21 discharging into a receptacle 22. By this means fragments of cotton or the like entering the interior of the drum may be drawn by suction, as later described, into the receptacle 22, and this receptacle may also be employed as a reservoir for an auxiliary supply of fibrous material if desired.

Disposed in the lower part of the receptacle 22 is a beveled disk or cone member 23 provided with corrugations 24. The member 23 is mounted for rotation by a motor 25, and is spaced slightly below baffle walls 26 to permit exit of portions of fibers as they are segregated by the rotation of the disk. A pipe 27 communicates with the lower compartment of container 22 and is connected at its opposite end with a pump 28. The exhaust side of this pump connects with a pipe 29 which is in turn connected with an elongated nozzle 30 extending throughout the length of the mill and directly above the rollers 3 thereof. It will thus be seen that in addition to the fibers picked up from the roll 5, other fibers such as those drawn from the interior of the drum and from the auxiliary supply in container 22 may be applied to the bulk of the rubber above the rollers 3. The portions of fibers are drawn from the lower chamber of the container 22 through the pipe 27 by pump 28 and through exhaust pipe 29 thereby separating the portions of fibers that may cling together, by action of the fan or pump and air currents. This rubber at the top of the rollers as well as that passing around the active roller is rendered adhesive by the continued kneading operation, thereby causing the fine fibers of cotton or other fibrous material to adhere to the surface thereof. These fibers will of course be worked into the rubber in a homogeneous manner as the milling operation continues.

Due to irregularities in the surface of the roll of fibrous material below the rollers 3, it often happens that portions of the rubber sheet passing around the forward roll fail to pick up their quota of fibers, and to overcome this difficulty a second roll 31 is mounted adjacent the forward roller and beyond the roll 5.

This drum or mandrel 31 is substantially identical with drum 5, being provided with tongues 32 to engage and prevent packing of the fibers wound around the drum, and being tapered at its ends to provide bearings for cooperation with a shaft 33. Brackets 34 provided with vertical slots 35 receive the ends of shaft 33 and thereby permit the roll 31 to rise and fall as may be necessary in remaining in contact with the rubber sheet passing over roller 3. These brackets are preferably bolted to the end plates of the mill as indicated by numeral 34'. The fibrous material may be normally retained on drum 31 by means of a retainer 36, indicated in this instance as a wire spirally wound around the roll of fibers after they are applied to the drum, and having its ends secured to rings 37 fixed to the ends of the drum.

The specific construction of one embodiment of a mechanism capable of performing the method of incorporating fibrous material in rubber compositions having been described, the operation of the mechanism will now be described.

The mechanism having been installed on any conventional type of rubber mill and it being desired to produce fiberized rubber, by which is meant a rubber containing about 50% or less of fiber, as contra-distinguished from a rubberized fiber, namely, a material containing about 50% or more of fiber, the rods 18 are removed, and the desired quantity of raw cotton, wool or the like is applied to the drum 5. The rods 18 are then replaced on the rings 17 so as to detachably secure the fibrous material on the drum. The same procedure is followed in connection with the drum 31, except that a spirally wound wire 36 may be employed instead of the rods, if desired, so as to reduce the weight of the mandrel in view of its lighter duty or function. In each instance it may be found desirable to weigh the drum before and after the milling operation so as to determine the percentage of fibrous material which has been incorporated in the rubber. It should also be noted that in some instances where relatively inexpensive grades of rubber material are desired, other materials may be added to the rubber such as powdered leather, cork, newsprint paper, wood pulp, fine sawdust and salt; these being intermingled with the fibrous materials on the drums 5 and 31 or in container 22, if preferred.

The mill having been set in operation, the rubber composition soon becomes hot and tacky and in addition a certain amount of static electricity is generated on the surface of the rubber. In this condition a portion of the rubber batch passes, in the form of a sheet, around the forward roller and returns to the main batch on top of the rollers. This operation is ordinarily continued for about 20 or 30 minutes and during that time the rubber sheet is continually passing over the fibrous rolls 5 and 31. As the rubber comes into contact with these rolls of material its tacky and partly electrified condition causes it to pick up small fragments, threads or fine fibers of the fibrous material and its surface is more or less uniformly covered with the individually separated fibers. As the covered sheet returns to the main batch it is kneaded or worked in the usual manner before again passing between the rollers 3, and during this kneading the fibers become uniformly distributed throughout the mass thereby serving to produce a homogeneous rubber stock at the completion of the milling operation.

During the usual milling operation this method of distributing the individual fibers through the mass of rubber will cause about 30% to 40%, by weight, of fibrous material to be picked up and assimilated by the rubber. This percentage of fiber is highly effective in increasing the tensile strength of the rubber and in improving its toughness and general wearing qualities. However, if a greater percentage of fiber is desirable, nozzle 30 and its associated container 22 with an auxiliary supply of fibrous material may be employed. The rotation of the corrugated disk 23 separates the individual fibers from the mass within the receptacle and the suction device 28 causes the same to be sprayed out of nozzle 30 onto the surface of the batch of tacky and partly electrified rubber lying on top of the rollers 3. The function of the disk 23 in separating the fibers will of course be facilitated by the action of the air currents in the pipes and the fan of the pump.

By resorting to this supplemental means for distributing fibers through the rubber composition, as much as 75% of fiber may be incorporated therein, producing what I have termed rubberized fiber. If a greater percentage of fibrous material is desired this may be accomplished by extending the milling operation slightly beyond the usual period so as to cause additional fibers to be picked up by the traveling sheet, or a part of the fibrous material may be incorporated in the rubber during the first milling operation prior to working the material in the warm-up mill.

In any and all of these operations it is to be noted that the fibers remain in their virgin state, that is, their tensile strength and other desirable qualities are in no way injured by solvents, maceration or other means for separating the fibers as heretofore generally practiced. It will therefore be understood that a much improved rubber or rubberized fiber product can be produced by the present method of uniformly distributing the uninjured fibers throughout the rubber composition.

From the foregoing description taken in connection with the accompanying drawings it will be apparent to those skilled in the art that I have provided a novel method of segregating individual fibers from a main supply and distributing them uniformly through a rubber batch, that the amount of rubber employed in a given product may be greatly reduced, that such product will have greater wearing qualities, be comparatively non-elastic, have greater tensile strength and toughness with less tendency to crack through oxidation, that the compressibility of the compound will be substantially reduced, that its degree of flexibility may be regulated in accordance with the amount of fibrous material employed, that it will be substantially lighter than ordinary rubber compositions and that the apparatus employed provides an inexpensive yet effective means for incorporating the fibers in the rubber in their original uncontaminated and uninjured state, thereby attaining their full strength and effectiveness in reinforcing the rubber in the manner indicated.

In accordance with the patent statutes I have described what I now believe to be the preferred method and apparatus for producing the improved rubber described herein but it is to be understood that various changes may be made in the steps of the process and in the details of the apparatus without departing from the spirit of the invention, and it is intended that all such changes be included within the scope of the appended claims.

What is claimed is:

1. The method of incorporating fibrous material in the form of separated fibers in rubber, which comprises placing a quantity of rubber in a rubber mill, milling the rubber until it becomes plastic and adhesive, rotating a batch of fibrous material contiguous to the rubber in the mill, whereby the adhesiveness of the rubber will cause same to pick up and separate fibers of the fibrous material, and thereafter working said fibers into the rubber.

2. Apparatus for distributing fibrous material through a batch of rubber, including a mill having a pair of rollers for working the rubber, a rotatable mandrel adapted to receive a quantity of fibrous material, and means for projecting the mandrel toward the rubber passing through the mill, holding the fibrous material in contact with the rubber, and allowing relative upward and downward movement thereof.

3. Apparatus for uniformly distributing fibrous material through a batch of rubber, including a mill having a pair of rollers for working the rubber, a rotatable mandrel adapted to receive a quantity of fibrous material, and means for movably supporting the mandrel with the fibrous material in contact with rubber passing through the mill.

4. Apparatus for uniformly distributing fibrous material through a batch of rubber, including a mill having a pair of rollers for working the rubber, a rotatable hollow mandrel adapted to receive a quantity of fibrous material, a plurality of prongs struck-up from the material of said mandrel for engaging the body of fibrous material, and a combined suction device and blower associated with the interior of the mandrel, whereby particles of fibrous material entering the interior of the mandrel will be withdrawn, and a nozzle associated with the blower for projecting said particles onto the rubber in the mill.

5. An apparatus for uniformly distributing fibrous material through a batch of rubber, including a mill having a pair of rollers for working the rubber, a perforated hollow mandrel adapted to have a quantity of fibrous material wound thereon, a compartmental container for a supply of fibrous material, means in the container for segregating portions of the fibers, to a lower compartment, a pipe communicating with mandrel and container, a nozzle positioned adjacent the roller; and a combined suction and blower device associated with and communicating with container and nozzle.

6. An apparatus for uniformly distributing fibrous material through a batch of rubber, including a mill having a pair of rollers for working the rubber, a compartmental container for a supply of fibrous materials, means in the container for segregating portions of the fibers to a lower compartment, a pipe communicating with lower compartment of the container, and a suction and blower device associated with the mill and in which the action of the blower and air currents draw the segregated portions of fibers from the lower compartment, separate the fibers and project them onto the body of the rubber in the mill.

7. Apparatus for uniformly distributing fibrous material through a batch of rubber, including a mill having a pair of rollers for working the rubber, a compartmental container for a supply of fibrous material, an inwardly directed conical-shaped baffle in said container, a corrugated conical-shaped disk spaced above the bottom of the container and mounted to be rotated from a source of power, and spaced slightly below the baffle, a pipe connected with the container below the disk, a nozzle on the opposite end of said pipe and spaced slightly above the rollers of the mill, and means for withdrawing the segregated portions of fibers from the lower compartment of the container, separating the fibers and projecting them through the nozzle onto a batch of rubber in the mill.

8. The method of incorporating fibrous material in the form of separated fibers in rubber, which comprises placing a quantity of rubber in a rubber mill, rotating a batch of fibrous material contiguous with a sheet of rubber on a roller of the mill, and operating the mill, whereby the rubber in passing through the mill will pick up fibers of the fibrous material.

9. The method of incorporating fibrous material in the form of separated fibers in rubber, which comprises placing a quantity of adhesive semi-milled rubber in a rubber mill, supporting a batch of fibrous material in contiguous contact with a sheet of uncured rubber on a roller of the mill, and operating the mill, whereby the rubber in passing through the mill will pick up fibers from the batch of fibrous material.

10. The method of incorporating fibrous material in the form of separated fibers in rubber, which comprises placing a quantity of conventional uncured rubber in a rubber mill, milling the rubber until it becomes plastic and adhesive, rotating a batch of fibrous material adjacent a roller of the mill, and operating the mill, whereby the rubber in passing through the mill will contact the fibrous material and pick up portions of segregated fibers thereof.

11. The method of incorporating fibrous material in rubber during the normal working thereof, which comprises placing a quantity of rubber in a rubber mill, milling the rubber until it becomes plastic and adhesive, rotating a batch of fibrous material contiguous with a sheet of adhesive rubber on a roller of the mill, operating the mill, whereby the adhesiveness of the rubber will cause the same to pick up and separate fibers of the fibrous material, and thereafter working said fibers into the rubber.

12. The method of incorporating raw cotton in the form of separate fibers in rubber, which comprises placing a quantity of rubber in a rubber mill, milling the rubber until it forms a plastic sheet of adhesive rubber on a roller of the mill, rotating a roll of raw cotton fibers parallel and contiguous with the sheet of rubber on the roller of the mill, and operating the mill, whereby the rubber in passing through the mill will pick up separate portions of the cotton fibers and segregate them from the original quantity of cotton.

13. Apparatus for uniformly distributing fibrous material through a batch of rubber, including a mill having a pair of rollers for working the rubber, and means for supporting fibrous material contiguous to the plastic and adhesive rubber as it passes through the mill.

14. Apparatus for uniformly distributing fibrous material through a batch of rubber, including a mill having a pair of rollers for working the rubber, and a mandrel for supporting the fibrous material in contact with the rubber passing through the mill.

15. That step in the method of incorporating fibrous material in the form of separated fibers in rubber as it is being worked in the conventional rubber mill, which comprises supporting a batch of fibrous material contiguous to the rubber passing through the mill.

16. That step in the method of incorporating fibrous material in the form of separated fibers in rubber as it is being worked in the conventional rubber mill, which comprises rotating a batch of fibrous material contiguous to the rubber passing through the mill and allowing the rubber to engage and separate individual fibers from the original quantity of fibrous material.

17. Apparatus for uniformly distributing fibrous material through a batch of rubber, including a mill having a pair of rollers for working the rubber, and means for rotatably supporting fibrous material for contact with the plastic and adhesive rubber as it passes through the mill.

JOHN W. KUHN.